United States Patent [19]
Celette

[11] Patent Number: 4,534,200
[45] Date of Patent: Aug. 13, 1985

[54] APPARATUS FOR MOUNTING AN AUTOMOBILE BODY ON A CHECKING FRAME

[75] Inventor: Germain Celette, Vienne, France

[73] Assignee: Celette S.A., Vienne, France

[21] Appl. No.: 597,537

[22] Filed: Apr. 6, 1984

[30] Foreign Application Priority Data

Apr. 6, 1983 [FR] France ................ 83 05578

[51] Int. Cl.³ ............................................. B21D 1/12
[52] U.S. Cl. ..................................... 72/305; 72/705; 33/180 AT
[58] Field of Search ............. 72/305, 705; 33/180 AT

[56] References Cited

U.S. PATENT DOCUMENTS

| | | | |
|---|---|---|---|
| 4,055,061 | 10/1977 | Bayorgeon et al. | 72/705 |
| 4,174,623 | 11/1979 | LeGrand et al. | 72/705 |
| 4,463,937 | 8/1984 | Celette | 72/705 |
| 4,479,305 | 10/1984 | Wendl et al. | 33/180 AT |

FOREIGN PATENT DOCUMENTS 0065942 12/1982 European Pat. Off. ............ 72/705

*Primary Examiner*—Lowell A. Larson
*Attorney, Agent, or Firm*—August E. Roehrig, Jr.

[57] ABSTRACT

The apparatus for mounting a damaged vehicle body on a checking frame comprises two cross-members carried by vertical end-plates and rigidly fixed to two mounting-plates. The first cross-member is intended to be fixed directly in holes of the longitudinal members of the checking frame. The second cross-member is mounted in an adjustable position on the longitudinal members by means of two sole-plates. Four vehicle body supports are slidably mounted on the cross-members and capable of receiving detachable positioning elements which are specific to each type of vehicle body. The two cross-members are raised to a sufficient height to permit positioning of the horizontal frame of a measuring device beneath the cross-members. The measuring device can thus rest on the longitudinal members of the checking frame so as to permit all the necessary checking operations.

15 Claims, 8 Drawing Figures

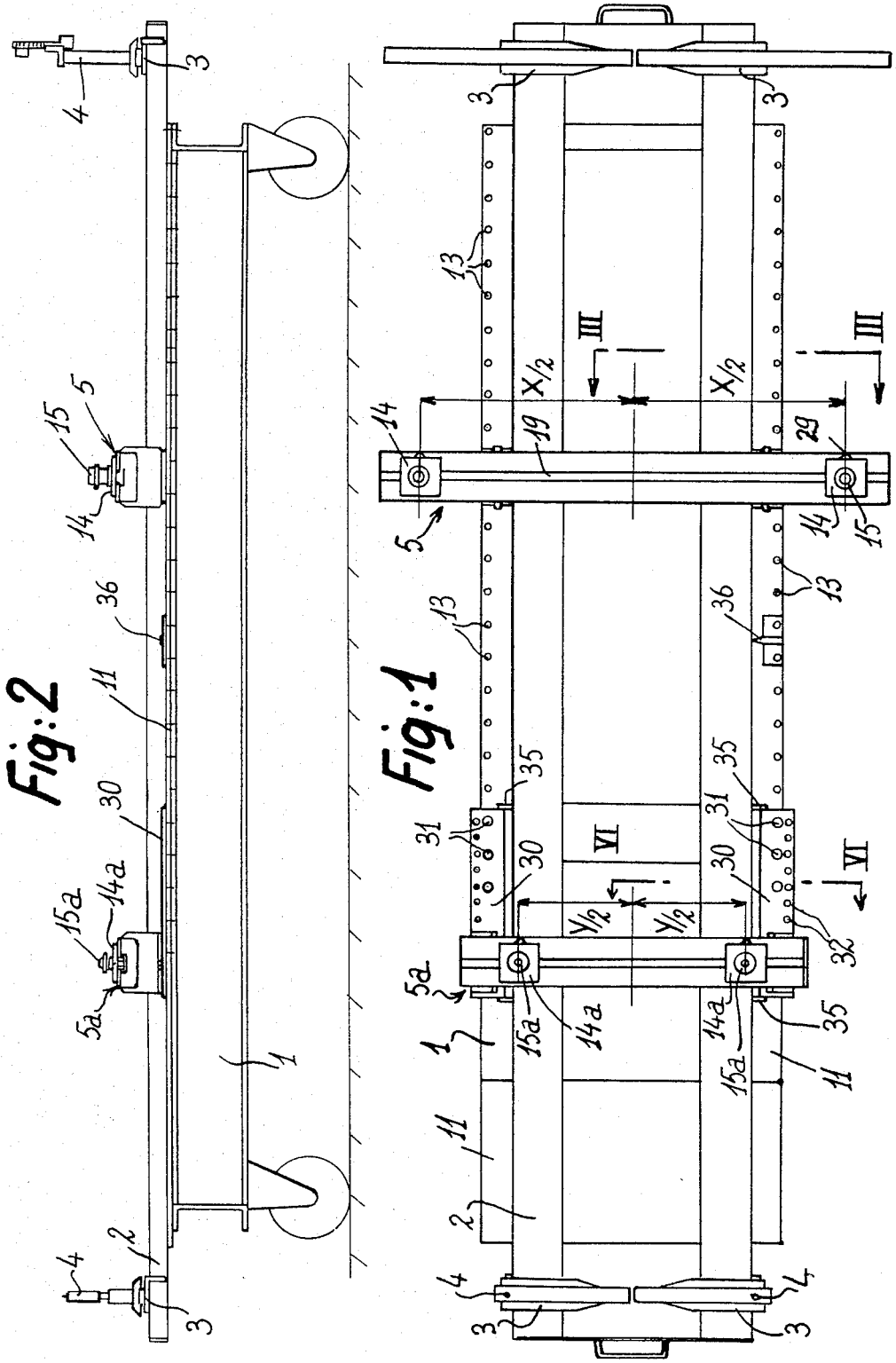

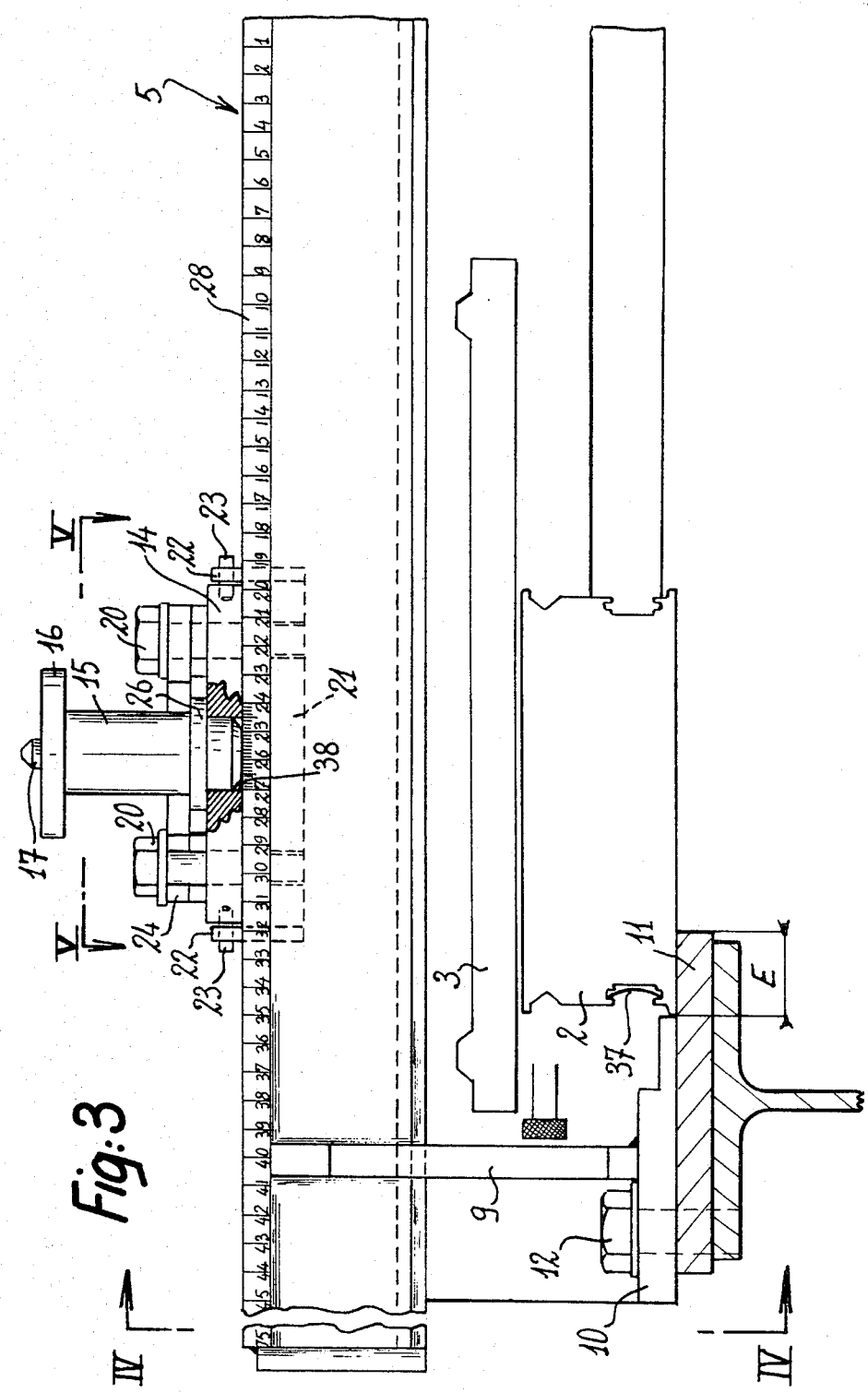

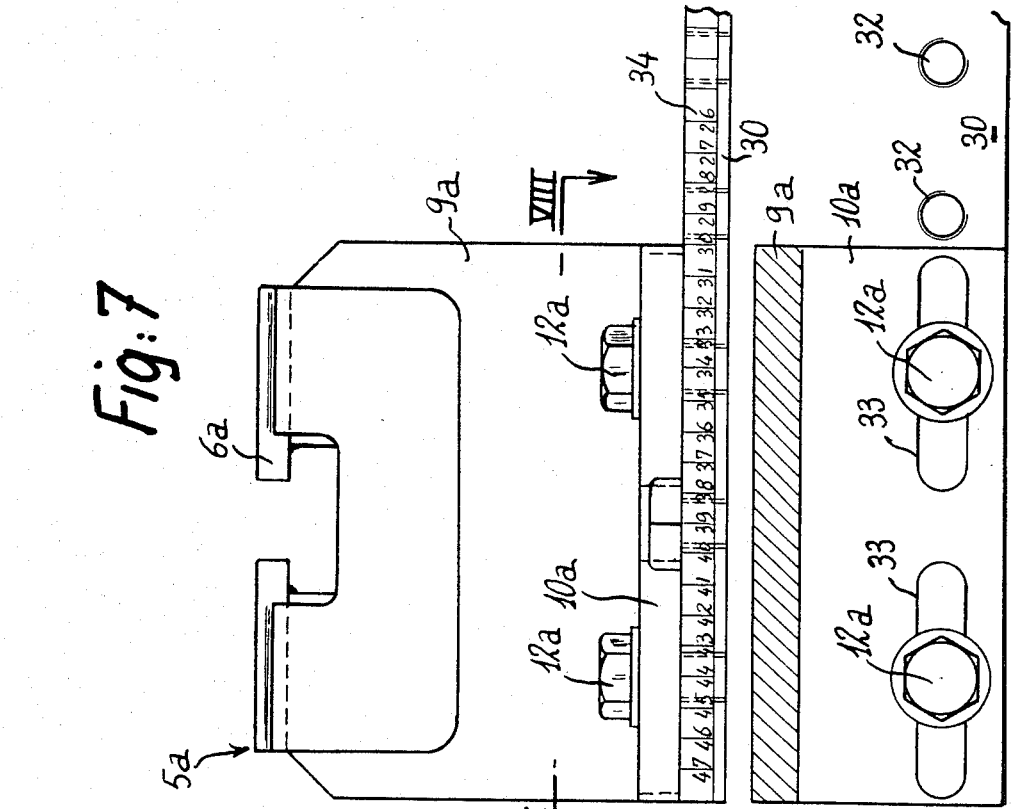
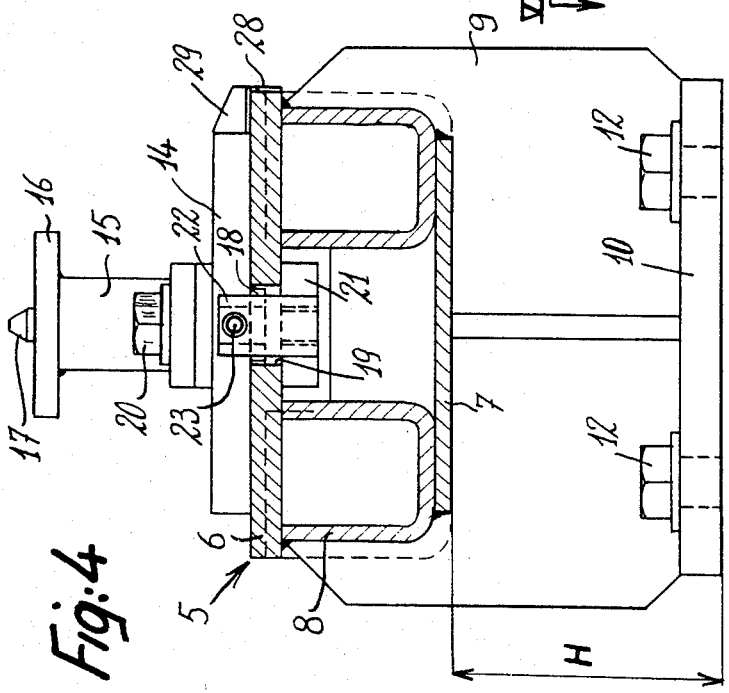

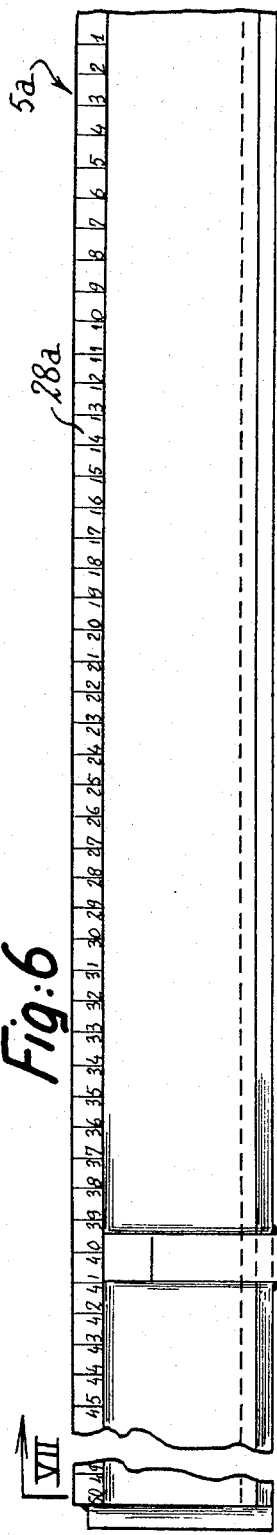
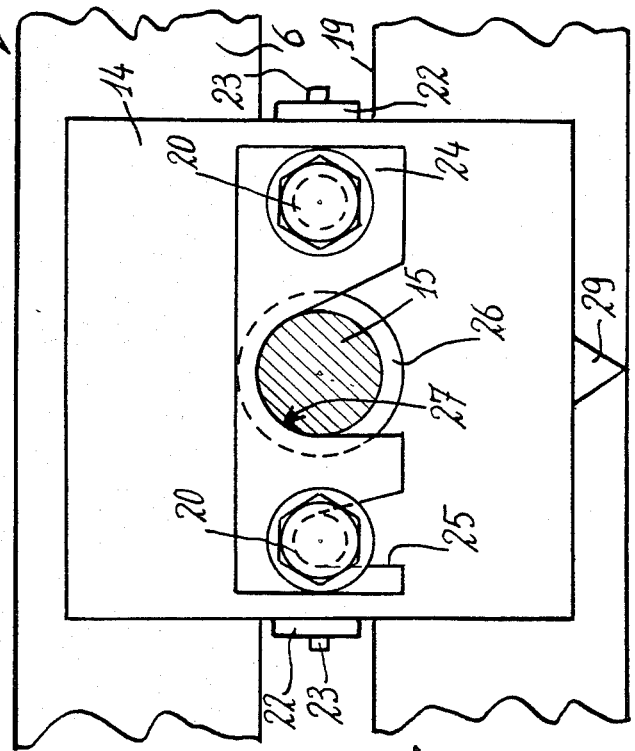
Fig. 5
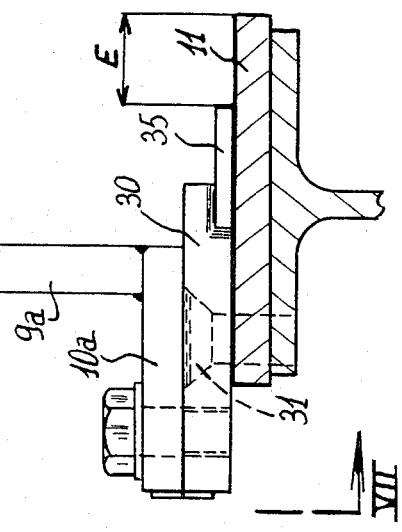
Fig. 6

APPARATUS FOR MOUNTING AN AUTOMOBILE BODY ON A CHECKING FRAME

BACKGROUND OF THE INVENTION

This invention in general relates to vehicle measuring apparatus and, in particular, to the operation which consists in mounting a damaged automobile body on a checking frame or bench jig in order to carry out essential checking operations by means of suitable measuring devices.

There already exist a large number of devices for fixing a vehicle body on a bench jig in order to carry out the desired checks as well as any repairs which may prove necessary. Devices of this type usually comprise clamps or jaw units designed to grip predetermined points of the vehicle body such as the bottom of the body, for example. These devices permit extremely strong attachment of the body to the bench jig for subsequent operations which involve straightening of damaged parts of the body. However, these devices are unnecessarily complicated and costly in the case of preliminary checking for possible deformations of a vehicle body. It is quite sufficient in such a case to place the body in a precise position on the bench jig in order that the necessary checks may then be carried out with measuring devices.

SUMMARY OF THE INVENTION

It is, therefore, an object of this invention to to improve appraratus for measuring and checking dimensions of a vehicle body.

Another object of the present invention is to permit the use of a measuring device consisting of a horizontal frame adapted to carry a series of checking gages movably mounted on the sides of said frame.

These and other objects are attained in accordance with the present invention wherein there is provided:

a first cross-member carried by two vertical end-plates rigidly fixed to two mounting-plates which can be fixed in the holes of the longitudinal members of the checking frame;

two sole-plates to be fixed on said longitudinal members in the longitudinal direction;

a second cross-member also carried by vertical end-plates rigidly fixed to two mounting-plates which can be fixed in adjustable positions on the sole-plates, said sole-plates being provided with modular holes in the direction of their length;

four vehicle body supports slidably mounted on said cross-members and capable of receiving detachable positioning elements which are specific to each type of vehicle body and are intended to cooperate with predetermined parts of the vehicle body;

an arrangement such that the two cross-members are raised to a sufficient height to permit positioning of the horizontal frame of a measuring device beneath said cross-members so that said measuring device can thus rest on the longitudinal members of the checking frame.

By means of this apparatus, it is thus possible to carry out any desired checking operations by making use of a measuring device of the type recalled earlier, that is to say a device comprising a frame fitted with a number of movable checking gages. However, the apparatus in accordance with the invention permits accurate positioning of the vehicle body to be checked, which is precisely an essential condition for carrying out the desired checking operations. Moreover, this accurate positioning can be achieved with any type of automobile since it is only necessary to change the detachable positioning elements which are specific to each type of car body and to comply with the indications provided by a table of measurements and reference valuses which is also specific to each type of vehicle body.

DESCRIPTION OF THE DRAWINGS

Other features of the invention will be more apparent upon consideration of the following description and accompanying drawings of a preferred embodiment of the invention with like reference numerals indicating corresponding parts throughout, wherein:

FIG. 1 is an overhead plan view of a vehicle body checking frame equipped with an apparatus in accordance with the invention as well as a measuring device, the frame of said device being engaged beneath the cross-members of said apparatus;

FIG. 2 is a view in side elevation showing the checking frame;

FIG. 3 is a fragmentary part-sectional view taken along line III—III of FIG. 1 but to a different scale;

FIG. 4 is a part-sectional view taken along lines IV—IV of FIG. 3;

FIG. 5 is a fragmentary part-sectional view taken along line V—V of FIG. 3;

FIG. 6 is a fragmentary part-sectional view taken along line VI—VI of FIG. 1 but to a different scale;

FIG. 7 is a sectional view taken along line VII—VII of FIG. 6;

FIG. 8 is a sectional view taken along line VIII—VIII of FIG. 7.

DESCRIPTION OF A PREFERRED EMBODIMENT

By means of the apparatus shown in these drawings, an automotive vehicle body (not illustrated) can be mounted on a checking frame 1 in order to carry out the desired checking operations by making use of a measuring device constituted by a horizontal frame 2. There are mounted on both sides of said measuring frame 2 a plurality of sliding support members 3 which are adapted to carry checking gages 4 or other suitable devices for checking the precise position of predetermined points of a vehicle body.

The apparatus under consideration comprises a first cross-member designated by the general reference 5. This cross-member is of hollow construction and can consist of two flat bars 6 and 7 joined together by U-section members 8 which form a free internal space (as shown in FIG. 4). The ends of said cross-member are fixed on two vertical end-plates 9 which are rigidly fixed in each case to a mounting-plate 10.

The distance between the two vertical end-plates 9 is such that their mounting-plates 10 can be attached to the top face of the longitudinal members 11 of the checking frame 1. This attachment is carried out by means of bolts 12 screwed into holes 13 which provide modular spacing and are formed in the longitudinal members 11. Thus the position of attachment of the cross-member 5 can be chosen so as to ensure that this latter is capable of supporting the corresponding rear portion of the vehicle body in the vicinity of the location of the rear wheels.

However, the position of said cross-member can vary only by a distance equal to the modular interval existing between two holes 13 of the longitudinal members of the checking frame.

On said cross-member 5 are mounted two movable supports 14 for supporting the bottom portion of the vehicle body to be mounted in position. Each movable support is provided with a recess 38 for accommodating an element 15 which has the intended function of a support proper and of a positioning element for the corresponding vehicle body. In accordance with the design considered in the example shown in the drawings, said element can consist of a stud 15, the upper end of which has an annular flange 16 as well as a nipple 17 which is intended to be engaged in a predetermined hole provided for this purpose in the bottom surface of the vehicle body. The support studs 15 thus fitted separately on the movable supports 14 must therefore be specific to each type of vehicle body.

The supports 14 are mounted so as to be capable of sliding along the cross-member 5, each support being guided on said cross-member by a rib 18 which is formed on the underface of said support and which is engaged within a longitudinal slot 19 of the top bar 6 of said cross-member. Locking of said supports in the desired position is carried out by means of two bolts 20 screwed into a claimping plate 21 placed against the underface of the bar 5, said bolts being engaged within the longitudinal slot 19. The clamping plate 21 is also attached to the corresponding movable support 14 by means of two retaining-arms 22 pivotally mounted on pins 23 carried by the ends of each movable support.

However, the arrangement is such that the bolts 20 are not only capable of locking each movable support 14 in the desired position but also of fixing in position the stud 15 which in turn has the function of supporting and positioning the vehicle body. To this end, a locking-plate 24 is pivotally mounted at one end on one of said bolts. At the other end, said locking plate has a recess 25 for engaging it beneath the other bolt 20. Since these bolts are located on each side of the opening provided for the positioning stud 15, the locking-plate 24 can thus be placed above an annular flange 26 provided at the base of said stud. The central portion of said locking-plate has another recess 27 through which the corresponding positioning stud 15 is intended to pass. These components can thus be very easily and rapidly mounted in position and locked on the movable supports 14.

The position of said movable supports in the traverse direction can be adjusted with precision by means of a double graduated scale 28 provided on one of the edges of the cross-member 5. In order to permit accurate position-setting, each movable support 14 is provided with a pointer 29 which moves opposite to the graduated scale, the zero of said scale being located opposite to the center of the cross-member 5. The result thereby achieved is that, in respect of a predetermined distance X between the stud axes, the pointers 29 of the two movable supports 14 need only be placed opposite to the numeral of either portion of said graduated scale which corresponds to one-half said distance between axes.

The apparatus in accordance with the invention comprises a second cross-member 5a which has the same general structure as the first cross-member but is of shorter length. This cross-member is intended to serve as a support for the front longitudinal member of the vehicle body to be fixed in position. However, in contrast to the first cross-member 5, this second cross-member 5a is not fixed directly in a predetermined position on the longitudinal members of the checking frame. Said second cross-member is in fact fixed on said longitudinal members by means of two sole-plates 30.

However, apart from these differences which will hereinafter be explained in detail, said second cross-member has the same general structure as the first cross-member 5 as well as the same components and accessories which are therefore designated by the same reference numerals followed simply by the index a. Thus the ends of said cross-member 5a are carried by vertical end-plates 9a rigidly fixed to mounting-plates 10a. The top bar 6a of said cross-member is adapted to carry two movable supports 14a on which positioning studs 15a can be adapted. The exact position of said supports can be determined by means of a graduated scale 28a provided on the edge of the cross-member 5a.

The sole-plates 30 which serve as intermediate elements for the attachment of the ends of the cross-member 5a are constituted by flat metal bars which are intended to be placed in the longitudinal direction above the longitudinal members 11 of the checking frame. Attachment of these sole-plates is carried out by means of countersunk-head screws 31.

Attachment of the mounting-plate 10a to the sole-plates 30 is carried out by means of bolts 12a screwed into internally-threaded bores 32 formed in said sole-plates. It should be noted, however, that said bolts are engaged through elongated slots 33 formed in the mounting-plates 10a, thus permitting precise final position-setting of the cross-member 5a in the longitudinal direction. It should also be pointed out that the sole-plates 30 are provided over their entire length with a series of holes 32 having a modular spacing which is distinctly smaller than that of the holes 13 of the longitudinal members 11 of the checking frame in order to permit a first position adjustment of the cross-member 5a in the longitudinal direction, final adjustment being carried out by sliding within the slots 33. In order to permit the desired adjustment, the sole-plates 30 are each provided with a graduated scale 34 located on their outer edge face or on their top face.

By reason of the fact that the two cross-members 5 and 5a are carried by vertical end-plates 9 and 9a, said cross-members are located at a height H with respect to the top faces of the longitudinal members 11 of the checking frame. In consequence, the frame 2 of the measuring device employed for the different checking operations which may be desired can be engaged beneath the cross-members. It is worthy of note in this connection that the mounting-plates 10 employed for fixing the first cross-member 5 do not occupy the full width of the longitudinal member 11 of the checking frame. A free margin E is in fact left on the inner side of each longitudinal member in order that the long sides 2 of the frame of the measuring device may thus be permitted to rest on the longitudinal members 11. In addition, each sole-plate 30 is adapted to carry at each end a guide stop 35 which also leaves a free margin E on the top face of each longitudinal member 11. Said guide stops as well as the inner edges of the mounting-plates 10 have the function of guiding the frame 2 of the measuring device when this latter is being placed in position. This frame can then be conveniently displaced by sliding along the longitudinal members 11 which thus support the measuring device.

Provision is preferably made on one of these longitudinal members for an indexing marker 36 for indicating a reference dimension on a graduated scale 37 provided on the side of the frame of the measuring device. This makes it possible to establish a precise relationship between this device and the two cross-members 5 and 5a of the apparatus in accordance with the invention.

The design concept of this apparatus is such as to offer a large number of advantages. Among these, the following are particularly worthy of note:

(a) the four points at which the vehicle body bears on the positioning members 15 need no longer be checked by the measuring device 2, which accordingly dispenses with all the gages or other checking elements of this device in the zone considered;

(b) the apparatus in accordance with the invention can be employed for vehicles of different types since it is only necessary to change the supporting and positioning elements 15;

(c) this change of positioning elements can in fact be carried out both easily and rapidly since these elements are simply engaged in the recesses 38 of the movable supports 14 and then locked in position by means of the pivotal locking-plates 24;

(d) it is possible to perform a highly accurate adjustment of the position of these different bearing elements by employing tables of measurement and reference values which are specific to each type of vehicle. It is accordingly an advantage to start by positioning the first cross-member 5, the changes of position of which correspond to the modular intervals provided between the holes 13, then to adjust the position-setting of the movable cross-member 5a which can be placed in all desired intermediate positions by virtue of the fact that it is fixed on intermediate sole-plates 30 and that holding-down bolts 12a are passed through the elongated slots 33;

(e) the movable supports 14 and 14a can be placed in all desired positions in the transverse direction, this operation being performed with high precision by virtue of the graduated scales 28 and 28a provided on the cross-members. These supports can then be placed opposite to a graduation numerals corresponding to one-half the design relative-spacing dimension, namely x/2 or y/2 as the case may be;

(f) it is not necessary to provide an indication of the dimensions in the vertical direction since the detachable supporting and positioning elements 15 are machined with due regard to the theoretical dimensions of measurement tables for measuring each specific type of vehicle;

(g) if the vehicle body mounted on the checking frame is to be subjected to straighening operations, forces are no longer applied solely to the bottom of the vehicle body but are distributed over the entire base of said body.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. Apparatus for mounting a damaged vehicle body on a checking frame having longitudinal members provided with internally-threaded modular holes, wherein said apparatus comprises in combination:
    a first cross-member carried by two vertical end-plates rigidly fixed to two mounting-plates which can be fixed in the holes of the longitudinal members of the checking frame;
    two sole-plates to be fixed on said longitudinal members in the longitudinal direction;
    a second cross-member also carried by vertical end-plates rigidly fixed to two mounting-plates which can be fixed in adjustable positions on the sole-plates, said sole-plates being provided in the direction of their length with holes having a smaller modular spacing than the holes of the longitudinal members of the checking frame;
    four vehicle body supports slidably mounted on said cross-members and capable of receiving detachable positioning elements which are specific to each type of vehicle body;
    an arrangement such that the two cross-members are raised to a sufficient height to permit positioning of the horizontal frame of a measuring device beneath said cross-members so that said measuring device can thus rest on the longitudinal members of the checking frame.

2. Apparatus according to claim 1, wherein the mounting-plates for fixing the second cross-member on the sole-plates are provided with elongated slots for insertion of the corresponding holding-down bolts.

3. Apparatus according to claim 1, wherein each movable support is adapted to carry a clamping-plate placed against the underface of the top wall of the corresponding cross-member and secured to said support by means of bolts engaged in a longitudinal slot of said cross-member.

4. Apparatus according to claim 3, wherein each movable support is provided with a recess in which the lower end of the positioning element is intended to be fitted and with a pivotal locking-plate which is capable of bearing on an annular flange formed on the positioning element in order to lock said element in position.

5. Apparatus according to claim 4, wherein the recess for receiving the lower end of a positioning element is located between the two bolts provided for securing the clamping plate, the locking-plate being pivotally mounted at one end on one of said bolts and provided at the opposite end with a recess for engagement of said locking-plate beneath the other bolt in the locking position.

6. Apparatus according to claim 1, wherein the mounting-plates for securing the ends of the two cross-members allow a free margin to remain on the top face of each longitudinal member of the checking frame, said free margin being intended to support the long sides of the frame of the measuring device employed for carrying out the desired checking operations.

7. Apparatus according to claim 1, wherein the cross-members are adapted to carry graduated scales for highly accurate position-setting of the movable supports in the transverse direction whilst the longitudinal sole-plates are each provided with a graduated scale for highly accurate position-setting of the second cross-member in the longitudinal direction.

8. A checking frame upon which a vehicle may be mounted for measuring and/or working on the vehicle, the checking frame including
at least two parallelly-spaced longitudinally extending frame-forming longitudinal members,
said longitudinal members each having a series of equally-spaced holes formed therein having a first on-center spacing,
a first cross-member carried upon said longitudinal members and extending transversely therebetween,
first mounting means operatively connected with said first cross-member for securing said first cross-member upon said longitudinal members, by means of said series of holes formed in said longitudinal members,
said first mounting means elevating said first cross-member above an upper surface of said longitudinal members,
a second cross-member carried upon said longitudinal members and extending transversely therebetween,
second mounting means operatively connected with said second cross-member for supporting said second cross-member in a position above an upper surface of said longitudinal members and including a series of equally-spaced holes having a second on-center spacing different from said first on-center spacing of said holes formed in said longitudinal members,
said second mounting means securing said second cross-member upon said longitudinal members by means of said series of equally-spaced holes having said second on-center spacing,
vehicle body support means carried by said first and second cross-members and selectively positionable thereupon for supporting a vehicle body placed upon the checking frame, and
means for mounting a vehicle measuring device upon said longitudinal members for selective positioning of the mounting device along said longitudinal members and beneath said first and second cross-members positioned above the upper surface thereof.

9. The checking frame of claim 8 wherein said second mounting means further includes adjusting means for varying the position of said second cross-members relative to said series of equally-spaced holes having said second on-center spacing to permit varying the distance between said first and second cross-members.

10. The checking frame of claim 8 wherein said vehicle body support means comprise selectively positionable post means independently releasably secured to said first and second cross-members for positioning said post means to accommodate various types of vehicle bodies.

11. The checking frame of claim 10 wherein said post means comprise interchangeable post members having diverse dimensional configurations for accommodating various types of vehicle bodies.

12. The checking frame of claim 11 wherein said post members are releasably secured to said first and second cross-members by means of a pivot latch selectively positionable to engage and lock said post members thereto.

13. The checking frame of claim 8 wherein said second mounting means includes a longitudinally extending sole-plate supported upon each of said longitudinal members and having a series of equally-spaced holes formed therein having an on-center spacing coincident with the on-center spacing of said series of equally-spaced holes formed in said longitudinal members, and by means of which each of said sole-plates are connected to one of said longitudinal members.

14. The checking frame of claim 13 wherein said series of equally-spaced holes having a second on-center spacing are formed in each of said sole-plates, and said second cross-member is secured to said sole-plates by means of said second on-center spaced holes.

15. The checking frame of claim 14 wherein said mounting means further includes a series of elongated slots for selectively positioning said second cross-member relative to said sole-plate.

* * * * *